United States Patent
Bashir et al.

(10) Patent No.: US 11,754,338 B2
(45) Date of Patent: Sep. 12, 2023

(54) METHOD TO DETECT TUBE LEAKAGE IN SHELL AND TUBE THERMOSIPHON REBOILERS

(71) Applicant: Saudi Arabian Oil Company, Dhahran (SA)

(72) Inventors: Haider A. Bashir, Abqaiq (SA); Mubarak F. Al-Rashid, Khobar (SA); Omar A. Dubayan, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 256 days.

(21) Appl. No.: 17/196,811

(22) Filed: Mar. 9, 2021

(65) Prior Publication Data
US 2022/0290920 A1    Sep. 15, 2022

(51) Int. Cl.
*G01M 3/28* (2006.01)
*F25J 3/02* (2006.01)

(52) U.S. Cl.
CPC ......... *F25J 3/0295* (2013.01); *G01M 3/2846* (2013.01); *F25J 2280/50* (2013.01)

(58) Field of Classification Search
CPC .................................................. G01M 3/2846
See application file for complete search history.

(56) References Cited

U.S. PATENT DOCUMENTS

| | | | |
|---|---|---|---|
| 4,138,856 A * | 2/1979 | Orlowski | G01M 3/3227 62/181 |
| 6,651,035 B1 * | 11/2003 | Lang | G05B 13/042 702/183 |
| 7,454,956 B1 * | 11/2008 | LoPresti | G01M 3/3227 73/49.3 |
| 10,670,353 B2 | 6/2020 | Victor et al. | |

(Continued)

FOREIGN PATENT DOCUMENTS

| CN | 101408466 B | 6/2010 |
|---|---|---|
| CN | 207891304 U | 9/2018 |

(Continued)

OTHER PUBLICATIONS

International Search Report and Written Opinion in Corresponding PCT Application No. PCT/US2022/070933 dated Jun. 7, 2022; 10 pages.

*Primary Examiner* — Hyun D Park
(74) *Attorney, Agent, or Firm* — Leason Ellis LLP (57) ABSTRACT

A method to continuously monitor for tube leakage in a shell and tube thermosiphon reboiler for heating feedstock in a fractionating column includes: determining the column is in service by continuously monitoring an input flow of the feedstock into the column; determining the reboiler is inactive by continuously monitoring an output valve of tube-side heating fluid from the reboiler; determining the reboiler is losing the heating fluid by continuously monitoring an output flow of the heating fluid from the reboiler; determining the reboiler is heat exchanging by continuously moni- (Continued)

toring a temperature difference between input and output flows of shell-side bottoms fluid with the column; and determining the tube leakage in the reboiler is taking place when the column is determined to be in service, the reboiler is determined to be inactive, the reboiler is determined to be losing the heating fluid, and the reboiler is determined to be heat exchanging.

21 Claims, 4 Drawing Sheets

(56) References Cited

U.S. PATENT DOCUMENTS

| | | | |
|---|---|---|---|
| 2005/0133211 A1* | 6/2005 | Osborn | F28F 19/00 165/157 |
| 2007/0107884 A1* | 5/2007 | Sirkar | F28F 21/062 165/158 |
| 2011/0162830 A1 | 7/2011 | Penton et al. | |
| 2018/0283811 A1* | 10/2018 | Victor | F28F 27/00 |
| 2018/0283816 A1* | 10/2018 | Victor | F28D 9/0006 |
| 2019/0128613 A1* | 5/2019 | Singh | F28D 7/005 |
| 2020/0340767 A1* | 10/2020 | Holden | H05K 7/20509 |

FOREIGN PATENT DOCUMENTS

| | | |
|---|---|---|
| CN | 108926859 A | 12/2018 |
| WO | 2018183537 A1 | 10/2018 |

* cited by examiner

METHOD TO DETECT TUBE LEAKAGE IN SHELL AND TUBE THERMOSIPHON REBOILERS

FIELD OF THE DISCLOSURE

The present disclosure relates to a method for detecting tube leakage in shell and tube thermo siphon reboilers.

BACKGROUND OF THE DISCLOSURE

Shell and tube heat exchangers are often used as reboilers in petrochemical refining. Tube leaks in such reboilers can create highly undesirable conditions including corrosion, mixing of incompatible fluids, over pressurization, fluid contamination, loss of heating media, and energy wastage. Such leaks can be difficult to detect as they take place within the reboiler, the reboiler may appear to be working as intended, and there is not normally any instrumentation within the reboiler capable of detecting such leaks.

It is in regard to these and other problems in the art that the present disclosure is directed to provide a technical solution for an effective method for detecting tube leakage in shell and tube thermosiphon reboilers.

SUMMARY OF THE DISCLOSURE

According to a first aspect of the disclosure, an automated method of detecting tube leakage in a shell and tube thermosiphon reboiler used to drive a fractionating column is provided. The method comprises: controlling, by a control circuit using process data, a fractionating process in the fractionating column using the shell and tube thermosiphon reboiler; continuously receiving, by the control circuit, first and second data of the process data from respective first and second devices for monitoring different aspects of an input flow of feedstock into the fractionating column; continuously determining, by the control circuit using the received first and second data, that the column is in service or not in service; continuously receiving, by the control circuit, third and fourth data of the process data from respective third and fourth devices for monitoring different aspects of an output flow of tube-side heating fluid from the reboiler; continuously determining, by the control circuit using the received third data, that the shell and tube thermosiphon reboiler is inactive or active; continuously determining, by the control circuit using the received fourth data, that the reboiler is losing or not losing the heating fluid; continuously receiving, by the control circuit, fifth and sixth data of the process data from respective fifth and sixth devices for monitoring temperatures of shell-side bottoms fluid respectively input to and output from the reboiler by a thermosiphon process in the reboiler; continuously determining, by the control circuit using the received fifth and sixth data, that the reboiler is heat exchanging or not heat exchanging; continuously determining, by the control circuit, that the tube leakage in the reboiler is taking place when the column is determined to be in service, the reboiler is determined to be inactive, the reboiler is determined to be losing the heating fluid, and the reboiler is determined to be heat exchanging, and is not taking place otherwise; and generating an alert, by the control circuit, when the tube leakage in the reboiler is determined to be taking place.

In an embodiment consistent with the above: the first device monitors a position of a first valve that controls a flow rate of the feedstock into the column, and outputs the monitored first valve position as the first data; the second device monitors the flow rate of the feedstock into the column, and outputs the monitored feedstock flow rate as the second data; and continuously determining that the column is in service comprises determining when both the received first data exceeds a first threshold and the received second data exceeds a second threshold, and is not in service otherwise.

In an embodiment consistent with the above: the third device monitors a position of a second valve that controls a flow rate of the heating fluid from the tube side of the reboiler, and outputs the monitored second valve position as the third data; continuously receiving the third data comprises setting a first start time to the present time at a beginning of the continuous receiving of the third data and when the received third data exceeds a third threshold; and continuously determining that the reboiler is inactive comprises determining when the difference between the current time and the first start time is at least a fourth threshold, and is active otherwise.

In an embodiment consistent with the above: the fourth device monitors a flow rate of the heating fluid output from the tube side of the reboiler, and outputs the monitored output heating fluid flow rate as the fourth data; continuously receiving the fourth data comprises setting a second start time to the present time at a beginning of the continuous receiving of the fourth data and when the received fourth data exceeds a fifth threshold; and continuously determining that the reboiler is losing the heating fluid comprises determining when the difference between the current time and the second start time is at least a sixth threshold, and is not losing the heating fluid otherwise.

In an embodiment consistent with the above: the fifth device monitors a temperature of a flow of bottoms fluid from the column and input to the shell side of the reboiler, and outputs the monitored input bottoms fluid temperature as the fifth data; the sixth device monitors a temperature of a flow of bottoms fluid output from the shell side of the reboiler into the column, and outputs the monitored output bottoms fluid temperature as the sixth data; and continuously determining that the reboiler is heat exchanging comprises determining when the difference between the received sixth data and the received fifth data is at least a seventh threshold, and is not heat exchanging otherwise.

In an embodiment consistent with the above, the method further comprises shutting down, by the control circuit, the reboiler when the tube leakage in the reboiler is determined to be taking place.

In an embodiment consistent with the above, the feedstock is petroleum, the column is a crude oil stabilizer, and the heating fluid is steam or water.

According to another aspect of the disclosure, a control circuit to detect tube leakage in a shell and tube thermosiphon reboiler used to drive a fractionating column is provided. The control circuit comprises: logic to control a fractionating process using process data, the fractionating process taking place in the fractionating column using the shell and tube thermosiphon reboiler; logic to continuously receive first and second data of the process data from respective first and second devices for monitoring different aspects of an input flow of feedstock into the fractionating column; logic to continuously determine, using the received first and second data, that the column is in service or not in service; logic to continuously receive third and fourth data of the process data from respective third and fourth devices for monitoring different aspects of an output flow of tube-side heating fluid from the reboiler; logic to continuously determine, using the received third data, that the shell and tube thermosiphon reboiler is inactive or active; logic to continuously determine, using the received fourth data, that the reboiler is losing or not losing the heating fluid; logic to continuously receive fifth and sixth data of the process data from respective fifth and sixth devices for monitoring temperatures of shell-side bottoms fluid respectively input to and output from the reboiler by a thermosiphon process in the reboiler; logic to continuously determine, using the received fifth and sixth data, that the reboiler is heat exchanging or not heat exchanging; logic to continuously determine that the tube leakage in the reboiler is taking place when the column is determined to be in service, the reboiler is determined to be inactive, the reboiler is determined to be losing the heating fluid, and the reboiler is determined to be heat exchanging, and is not taking place otherwise; and logic to generate an alert when the tube leakage in the reboiler is determined to be taking place.

In an embodiment consistent with the control circuit described above: the first device monitors a position of a first valve that controls a flow rate of the feedstock into the column, and outputs the monitored first valve position as the first data; the second device monitors the flow rate of the feedstock into the column, and outputs the monitored feedstock flow rate as the second data; and the logic to continuously determine that the column is in service comprises logic to determine that the column is in service when both the received first data exceeds a first threshold and the received second data exceeds a second threshold, and is not in service otherwise.

In an embodiment consistent with the control circuit described above: the third device monitors a position of a second valve that controls a flow rate of the heating fluid from the tube side of the reboiler, and outputs the monitored second valve position as the third data; the logic to continuously receive the third data comprises logic to set a first start time to the present time at a beginning of the continuous receiving of the third data and when the received third data exceeds a third threshold; and the logic to continuously determine that the reboiler is inactive comprises logic to determine that the reboiler is inactive when the difference between the current time and the first start time is at least a fourth threshold, and is active otherwise.

In an embodiment consistent with the control circuit described above: the fourth device monitors a flow rate of the heating fluid output from the tube side of the reboiler, and outputs the monitored output heating fluid flow rate as the fourth data; the logic to continuously receive the fourth data comprises logic to set a second start time to the present time at a beginning of the continuous receiving of the fourth data and when the received fourth data exceeds a fifth threshold; and the logic to continuously determine that the reboiler is losing the heating fluid comprises logic to determine that the reboiler is losing the heating fluid when the difference between the current time and the second start time is at least a sixth threshold, and is not losing the heating fluid otherwise.

In an embodiment consistent with the control circuit described above: the fifth device monitors a temperature of a flow of bottoms fluid from the column and input to the shell side of the reboiler, and outputs the monitored input bottoms fluid temperature as the fifth data; the sixth device monitors a temperature of a flow of bottoms fluid output from the shell side of the reboiler into the column, and outputs the monitored output bottoms fluid temperature as the sixth data; and the logic to continuously determine that the reboiler is heat exchanging comprises logic to determine that the reboiler is heat exchanging when the difference between the received sixth data and the received fifth data is at least a seventh threshold, and is not heat exchanging otherwise.

In an embodiment consistent with the control circuit described above, the control circuit further comprises logic to shut down the reboiler when the tube leakage in the reboiler is determined to be taking place.

In an embodiment consistent with the control circuit described above, the feedstock is petroleum, the column is a crude oil stabilizer, and the heating fluid is steam or water.

According to yet another aspect of the disclosure, a non-transitory computer readable medium (CRM) having computer instructions stored therein that, when executed by a processing circuit, cause the processing circuit to carry out an automated process of detecting tube leakage in a shell and tube thermosiphon reboiler used to drive a fractionating column is provided. The process comprises: controlling a fractionating process using process data, the fractionating process taking place in the fractionating column using the shell and tube thermosiphon reboiler; continuously receiving first and second data of the process data from respective first and second devices for monitoring different aspects of an input flow of feedstock into the fractionating column; continuously determining, using the received first and second data, that the column is in service or not in service; continuously receiving third and fourth data of the process data from respective third and fourth devices for monitoring different aspects of an output flow of tube-side heating fluid from the reboiler; continuously determining, using the received third data, that the shell and tube thermosiphon reboiler is inactive or active; continuously determining, using the received fourth data, that the reboiler is losing or not losing the heating fluid; continuously receiving fifth and sixth data of the process data from respective fifth and sixth devices for monitoring temperatures of shell-side bottoms fluid respectively input to and output from the reboiler by a thermosiphon process in the reboiler; continuously determining, using the received fifth and sixth data, that the reboiler is heat exchanging or not heat exchanging; continuously determining that the tube leakage in the reboiler is taking place when the column is determined to be in service, the reboiler is determined to be inactive, the reboiler is determined to be losing the heating fluid, and the reboiler is determined to be heat exchanging, and is not taking place otherwise; and generating an alert when the tube leakage in the reboiler is determined to be taking place.

In an embodiment consistent with the CRM described above: the first device monitors a position of a first valve that controls a flow rate of the feedstock into the column, and outputs the monitored first valve position as the first data; the second device monitors the flow rate of the feedstock into the column, and outputs the monitored feedstock flow rate as the second data; and continuously determining that the column is in service comprises determining when both the received first data exceeds a first threshold and the received second data exceeds a second threshold, and is not in service otherwise.

In an embodiment consistent with the CRM described above: the third device monitors a position of a second valve that controls a flow rate of the heating fluid from the tube side of the reboiler, and outputs the monitored second valve position as the third data; continuously receiving the third data comprises setting a first start time to the present time at a beginning of the continuous receiving of the third data and when the received third data exceeds a third threshold; and continuously determining that the reboiler is inactive comprises determining when the difference between the current time and the first start time is at least a fourth threshold, and is active otherwise.

In an embodiment consistent with the CRM described above: the fourth device monitors a flow rate of the heating fluid output from the tube side of the reboiler, and outputs the monitored output heating fluid flow rate as the fourth data; continuously receiving the fourth data comprises setting a second start time to the present time at a beginning of the continuous receiving of the fourth data and when the received fourth data exceeds a fifth threshold; and continuously determining that the reboiler is losing the heating fluid comprises determining when the difference between the current time and the second start time is at least a sixth threshold, and is not losing the heating fluid otherwise.

In an embodiment consistent with the CRM described above: the fifth device monitors a temperature of a flow of bottoms fluid from the column and input to the shell side of the reboiler, and outputs the monitored input bottoms fluid temperature as the fifth data; the sixth device monitors a temperature of a flow of bottoms fluid output from the shell side of the reboiler into the column, and outputs the monitored output bottoms fluid temperature as the sixth data; and continuously determining that the reboiler is heat exchanging comprises determining when the difference between the received sixth data and the received fifth data is at least a seventh threshold, and is not heat exchanging otherwise.

In an embodiment consistent with the CRM described above, the process further comprises shutting down the reboiler when the tube leakage in the reboiler is determined to be taking place.

In an embodiment consistent with the CRM described above, the feedstock is petroleum, the column is a crude oil stabilizer, and the heating fluid is steam or water.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

Example embodiments of the present disclosure are directed to methods of dynamically and continuously detecting tube leaks in shell and tube heat exchangers used in reboiler services, such as for petrochemical refining. Early detection of such tube leaks can help minimize their deleterious effects and allow more effective maintenance and production planning of refinery equipment. Example embodiments use logic-based evaluation of process data to detect abnormalities and indications of tube leaks in order to provide early warnings and alerts to the operators or automated tasks. Multiple parameters are verified and compared to set or predetermined criteria to ensure erroneous identification of tube leaks is minimized. The combined effect of the logic and use of multiple parameters provides early tube leak detection with a high level of confidence.

As discussed earlier, shell and tube type heat exchangers are commonly used in process industries to exchange heat between process streams. This includes their use as reboilers in mass transfer processes such as distillation, stripping, stabilizing, or fractionating. Condensing heating media are routinely used in such process facilities. These reboilers are critical in meeting product specifications by ensuring adequate heat is added to the process for proper separation of components. Often these reboilers are configured with thermosiphon flow utilizing the temperature dependent density differences of the process fluid. A frequent problem in such reboilers is the leakage of fluid between the tube-side and the shell-side. Such leakage can create highly undesirable conditions including corrosion, mixing of incompatible fluids, over pressurization, fluid contamination, loss of heating media, and wasted energy.

It is in regard to these and other problems that embodiments of the present disclosure are directed to effective techniques for detecting tube-side leakage in shell and tube thermosiphon reboilers. Early detection of such tube leaks can help minimize the undesirable consequences mentioned above and allow more effective maintenance and production planning. The methods and other techniques detailed herein utilize logic-based evaluation of process data to indicate tube leakage for early and effective action. In some such embodiments, commonly available sensors for heat exchangers in the processing industries are used to generate the process data for the tube leak detection logic. This is in contrast to alternative approaches, such as using custom instrumentation to detect leakage in a shell and tube heat exchanger. In some embodiments, an operator is notified through a distributed control system (DCS) alarm of the suspected leak.

Example embodiments utilize available process data and logically evaluate the data to identify and alert, for example, operators, appropriate personnel, or automated control systems of potential leaks. In some such embodiments, this is carried out through verification and comparison of key data against set or predetermined criteria. These solutions ensure that abnormalities in the process data that can identify tube leaks are detected, verified, and alerted (e.g., to an operator). The logic can be implemented in multiple platforms, such as with DCS or machine learning tools (like ProcessHub).

Example embodiments detect tube leakage online using multiple continuously measured parameters from various process control sensors. These parameters are compared to set or predetermined values indicative of conditions being tested for tube-side leakage. The comparisons are input into logical operators that enable tube leak detection while minimizing errors in such detection.

Example embodiments provide for detecting tube leaks in heat exchangers as well as notifying plant operators of the suspected leaks to troubleshoot the equipment and minimize energy waste. In some such embodiments, the techniques do not require any specialized sensors or additional devices to detect the leak, instead relying on normal process sensors used to control reboiler operation. As such, some such embodiments provide for control mechanisms implemented as efficient tools on existing thermosiphon shell and tube heat exchangers. Example embodiments of these features and techniques are illustrated in FIGS. 1-4 and described in the text that follows.

Figure 1:
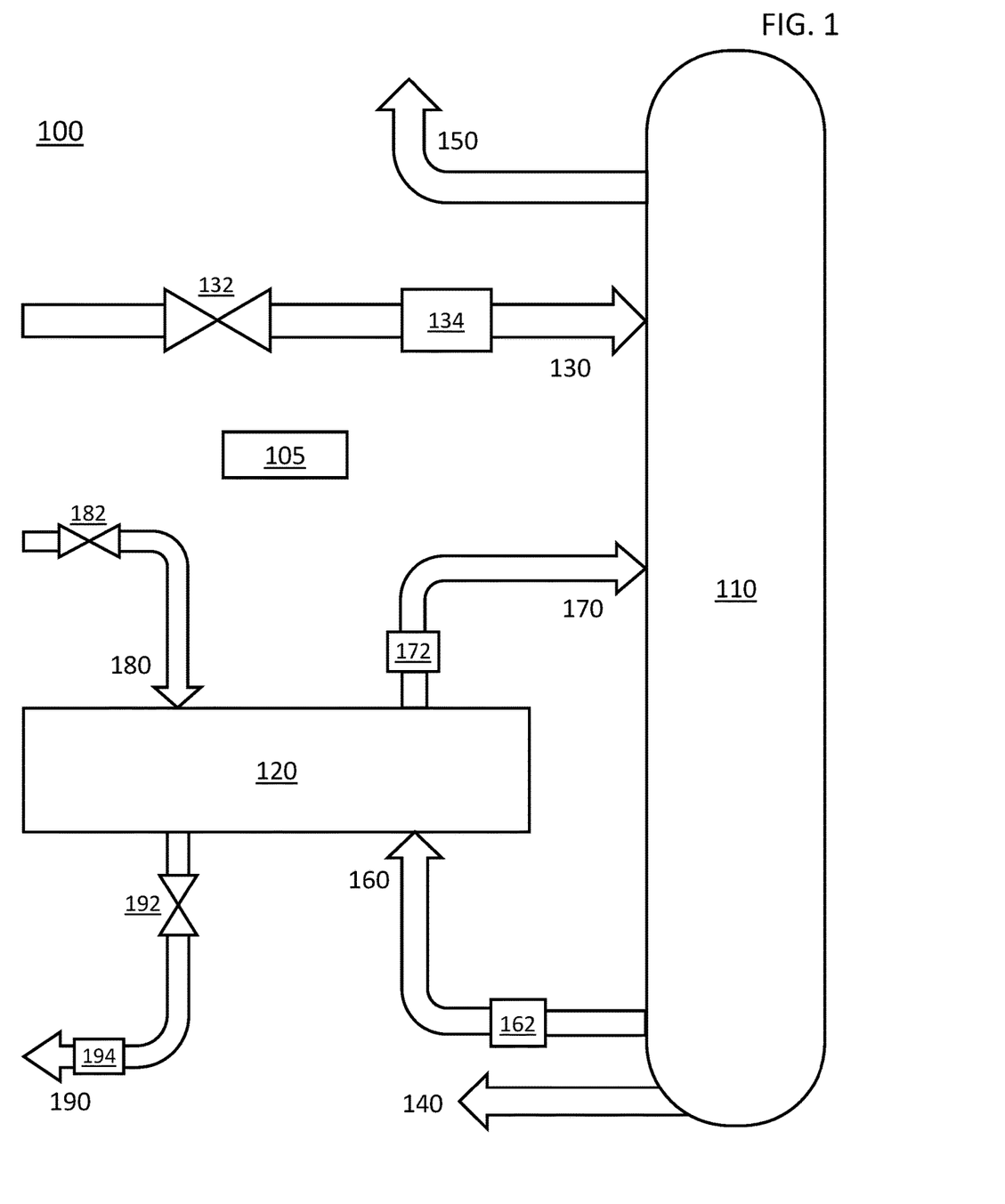
FIG. 1 is a schematic diagram of an example system for detecting tube leakage in a shell and tube thermosiphon reboiler, according to an embodiment.

FIG. 1 is a schematic diagram of an example system 100 for detecting tube leakage in a shell and tube thermosiphon reboiler 120, according to an embodiment. In FIG. 1, the thermosiphon reboiler 120 is part of a crude stabilizer 110 for stabilizing crude oil feedstock by separating overhead gases 150 from the feedstock 130, yielding stabilized crude oil 140 in the process.

In further detail, the crude stabilizer 110 employs a fractionating column that distills or separates gaseous components from the feedstock 130 (output as overhead gas 150), which lowers the vapor pressure of the feedstock 130 into stabilized crude oil 140. The stabilized crude 140 is then safe for transport or storage in more conventional means. To enable the fractionation, the reboiler 120 heats the cooler feedstock (unheated bottoms fluid 160) from the column and sends it back to the column as heated bottoms fluid 170 using a thermosiphon process. The thermosiphon process takes place in the shell portion of the shell and tube reboiler 120 using the bottoms fluid 160 from the column, while the heating fluid (in this case, desuperheated steam 180, also known as wet steam) is directed through the tube portion of the reboiler 120. The heat exchanging takes place at the tube walls inside the reboiler 120 as the steam 180 exchanges heat with the bottoms fluid 160. The heating of the bottoms fluid 160 causes it to exit the reboiler 120 at the top as heated bottoms fluid 170 (and back into the crude stabilizer 110), which in turn draws more unheated bottoms fluid 160 from the bottom of the reboiler 120 as part of a thermosiphon effect. Meanwhile, the steam 180 cools and condenses as a result of the heat exchanging and exits the reboiler 120 as condensate 190.

This thermodynamic process takes place as a control loop under the control of control logic 105. To this end, various instrumentation is used throughout the control loop to control the different processes and keep the process stable and in equilibrium. For instance, some of this process control instrumentation includes feedstock crude oil valve 132 for controlling the input flow of crude oil feedstock 130 into the column 110, and feedstock crude oil flow sensor 134 for measuring a flow rate of the crude oil feedstock controlled by the feedstock valve 132. The instrumentation also includes a steam valve 182 for controlling the amount of desuperheated steam 180 input into the reboiler 120, a condensate valve 192 for controlling the amount of condensate 190 output from the reboiler 120, and a condensate flow sensor 194 for measuring a flow rate of the condensate 190 exiting the reboiler 120. In addition, the control loop instrumentation includes a bottoms input temperature sensor 162 for measuring the temperature of the unheated bottoms fluid 160 entering the reboiler 120, and a bottoms output temperature sensor 172 for measuring the temperature of the heated bottoms fluid 170 exiting the reboiler 120.

Normally, the tube portion (or tube) of the shell and tube reboiler 120 is leakproof, and there is no transfer of the steam 180 to the bottoms fluid 160 (i.e., a tube-side leak from the tube to the shell) within the reboiler 120. However, over time and due to effects such as corrosion, design weaknesses, or the like, leaks can develop between the tube and the shell. These can be difficult to detect because such leaks are usually not visible and there are usually no specialized instruments within the reboiler 120 to detect such leaks. However, the effects of such leaks can be costly as they lead to the contamination of the bottoms fluid 160 with the heating fluid 180.

Figure 2:
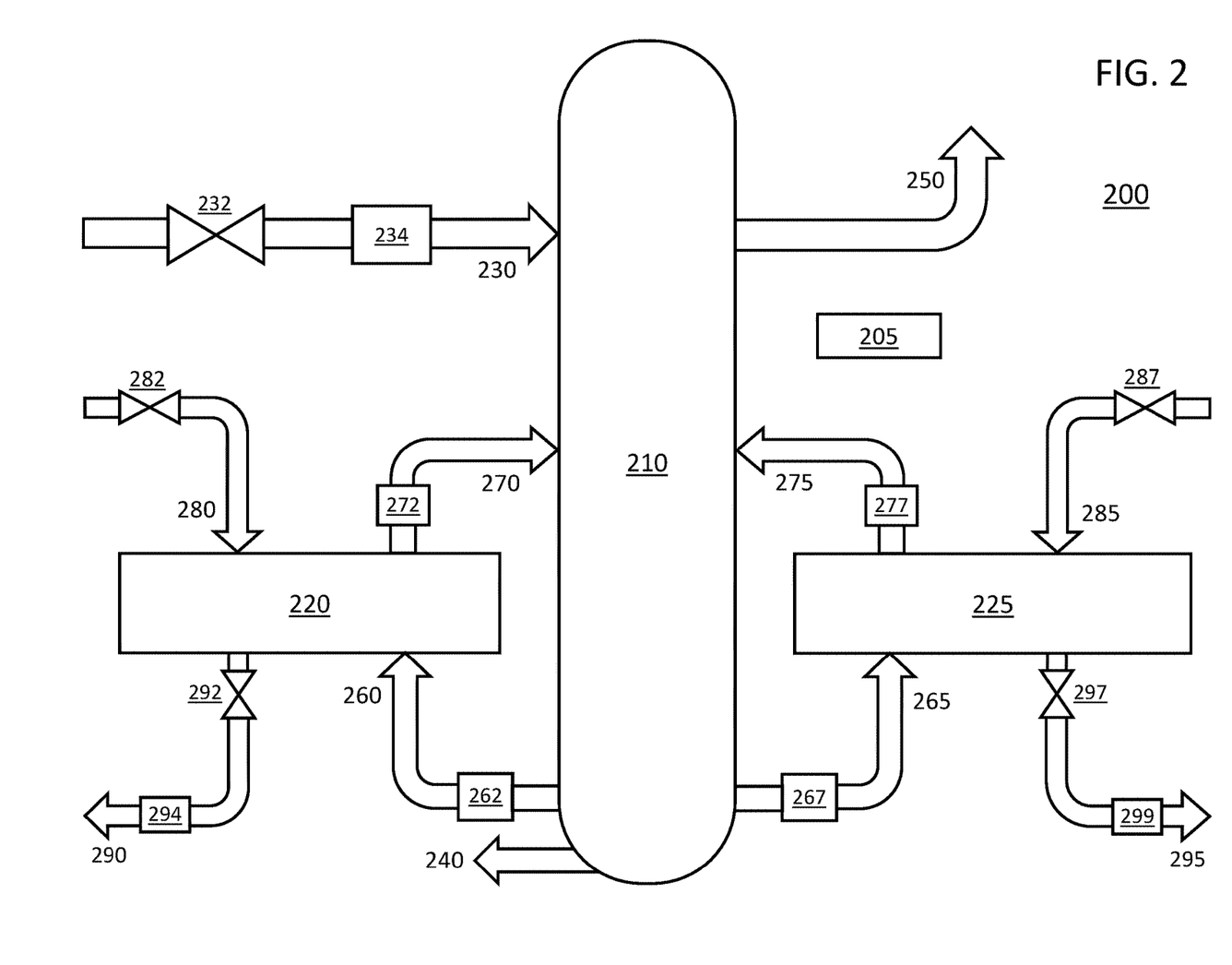
FIG. 2 is a schematic diagram of an example system for detecting tube leakage in a shell and tube thermosiphon reboiler, according to another embodiment.

FIG. 2 is a schematic diagram of an example system 200 for detecting tube leakage in a shell and tube thermosiphon reboiler 220 or 225, according to another embodiment. The system 200 is similar to the system 100, including crude oil feedstock 230 input into a crude stabilizer 210 (or column) to output overhead gas 250 and stabilized crude oil 240 under the control of control logic 205. However, in the system 200, there are two separate reboilers 220 and 225. In the system 200, each of the reboilers 220 and 225 can operate independently, such as taking one reboiler offline for maintenance or reduced production needs, or running both reboilers 220 and 225 together to maximize production capacity. In addition, there is a single crude oil feedstock 230 input to the crude stabilizer column 210. The crude oil feedstock 230 is regulated by the crude oil valve 232 that controls a flow of the feedstock 230 into the column 210, and by a crude oil flow sensor 234 that senses the flow rate of the feedstock 230 into the stabilizer column 210.

In further detail, each of the reboilers 220 and 225 is equipped with its own devices and has its own fluid flows. For ease of description, the operation of reboiler 220 is described, with comparable reference numbers for reboiler 225 indicated parenthetically. In reboiler 220 (225), unheated bottoms fluid 260 (265) is input to the bottom of the reboiler 220 (225), more specifically to the shell portion of the bottom of the shell and tube reboiler 220 (225). The unheated bottoms fluid 260 (265) is regulated by an input temperature sensor 262 that senses the temperature of the bottoms fluid 260 (265) before entering the reboiler 220 (225). Meanwhile, desuperheated steam 280 (285), or wet steam, is input to the tube portion of the shell and tube reboiler 220 (225) as regulated by a steam valve 282 (287), more specifically from the top of the tube portion of the reboiler 220 (225). The steam 280 (285) exchanges heat with the bottoms fluid 260 (265) at the boundary of the tube and shell portions of the reboiler 220 (225), which heats the bottoms fluid 260 (265) and cools the steam 280 (285) into condensate 290 (295). The condensate 290 (295) is regulated by a condensate valve 292 (297) which controls a flow of the condensate 290 (295) out of the reboiler 220 (225), and a condensate flow sensor 294 (290) which senses the flow rate of the condensate 290 (295) out of the reboiler 220 (225), more specifically from the bottom of the tube portion of the reboiler 220 (225).

The heated bottoms fluid 270 (275) exits the reboiler 220 (225) from the top of the shell portion, where it is directed to the crude stabilizer column 210 for further fractionating. It is regulated by an output temperature sensor 272 (277), which monitors the temperature of the heated bottoms fluid 270 (275) after it exits the reboiler. The shell of the reboiler 220 (225) is kept full of bottoms fluid 260 (265) that is heat exchanging with the steam 280 (285) in the tube of the reboiler 220 (225). As the heated bottoms fluid 270 (275) exits the reboiler 220 (225) at the top, a corresponding amount of unheated bottoms fluid 260 enters the reboiler 220 (225) from the bottom due to thermosiphoning.

Figure 3:
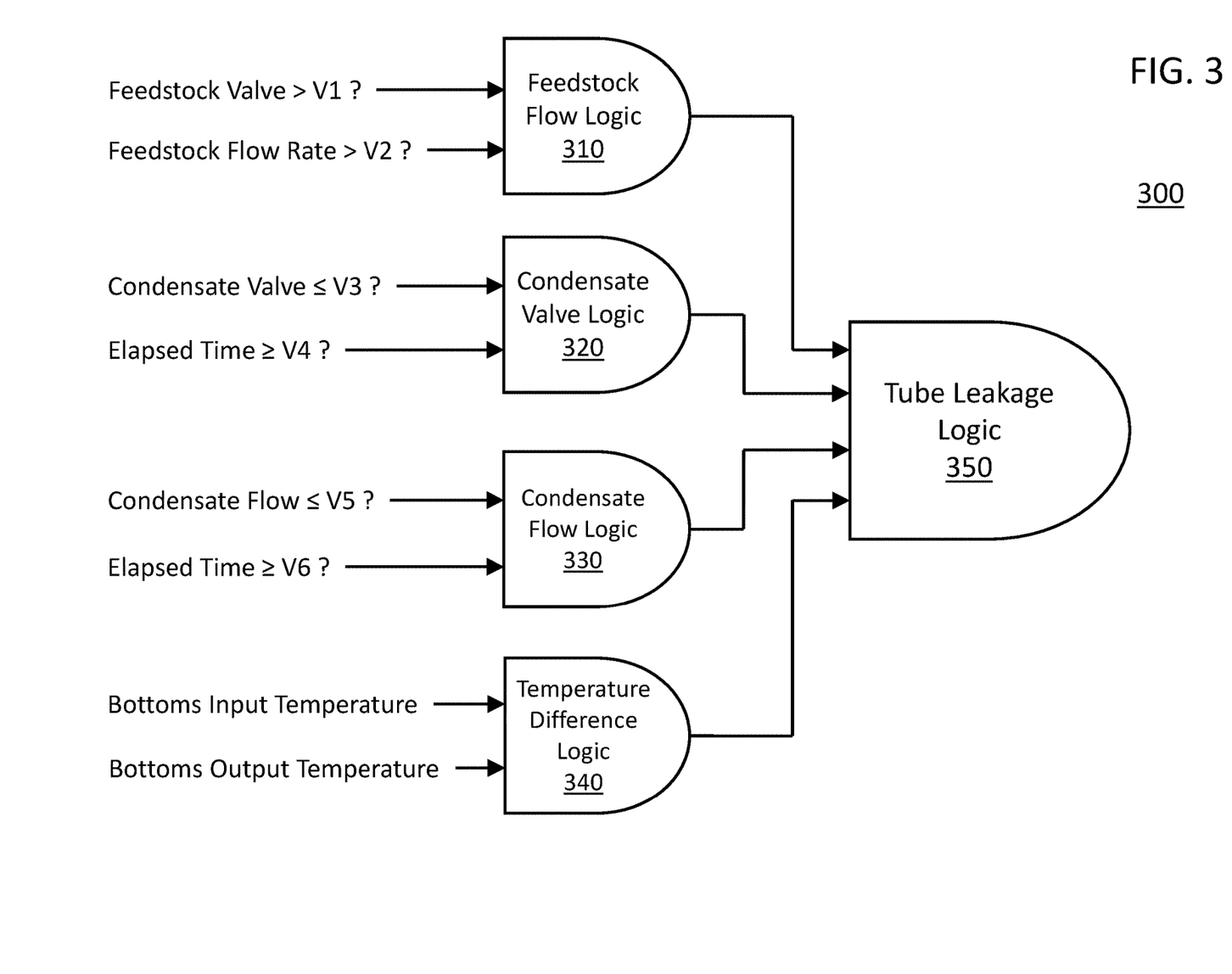
FIG. 3 is a schematic diagram of example control logic using process data for detecting tube leakage in a shell and tube thermosiphon reboiler that is part of a fractionating column, according to an embodiment.

FIG. 3 is a schematic diagram of example control logic 300 using process data for detecting tube leakage in a shell and tube thermosiphon reboiler (such as reboiler 120, 220, or 225) that is part of a fractionating column (such as crude stabilizer 110 or 210), according to an embodiment. FIG. 3 illustrates an example tube leak-detection logic 300 based on assessment of process data. Process data is that control or instrumentation data used to drive the fractionating column or reboiler during normal operation, such as part of a control loop. The process data is obtained from controls (e.g., valve controls) and instrumentation (e.g., flow rate sensors, temperature sensors) outside of the reboiler. The control logic 300 can be implemented in a variety of ways, including hardware (e.g., custom logic circuits), firmware (such as with customizable logic circuits), or software (e.g., computer instructions executable on a processing circuit such as an electronic processor or microprocessor).

Briefly, the control logic 300 of FIG. 3 highlights how the logic works in an example embodiment, and identifies when tube leakage has commenced. When all of the logical verifications 310, 320, 330, and 340 are active and valid, this indicates tube leakage, which is identified by tube leakage logic 350 and an alert is created (e.g., to an operator, an automated task, or the like). In various embodiments, the control logic 300 can be implemented on various platforms (such as DCS, digital twins, machine learning tools such as ProcessHub, or comparable platform) for ensuring the correct entity is alerted at the earliest practical opportunity to this abnormality, and without generating false alerts.

In further detail, the control logic 300 breaks into four components: (i) making sure the fractionating column is in service, (ii) making sure the reboiler is inactive, (iii) making sure the reboiler is losing heating fluid, and (iv) making sure the reboiler is heat exchanging. These four components are used to make sure any tube-side leaks are detected while other events not resulting from tube-side leaks are not detected (i.e., not raised as false alarms). The suppression of false alarms (e.g., avoiding false positives) is every bit as important as the raising of true alarms (e.g., avoiding false negatives). Accordingly, two of these components are testing for normal conditions (e.g., fractionating and heat exchanging) while the other two components are testing for abnormal conditions (e.g., drops in heating fluid exiting the reboiler). These four components, which taken together clearly indicate something abnormal (e.g., a reboiler that is inactive yet also heat exchanging), have only one reasonable explanation: a tube-side leak of the heating fluid within the reboiler. The use of process data is important to avoid the complication and expense of building and maintaining specialized internal sensors within the reboiler to detect tube-side leaks. Process data is primarily used to control processes, in this case the fractionation process.

In still further detail, the first component (verification of equipment service) is making sure the fractionating column is in service (e.g., actively fractionating the feedstock). As the tube-side leak detection logic 300 uses process data to make its determination, the fractionating column needs to be in operation (e.g., part of an active process) in order for the process data to detect abnormalities, such as tube-side leaks. In this case, feedstock flow into the fractionating column, as implemented in feedstock flow logic 310, is used to satisfy this component. More specifically, in the feedstock flow logic 310, two distinct indicators of feedstock flow into the column are used to represent the first component. Two indicators are used to minimize the chance that transitory indicators of feedstock flow lead to false alarms in the detection logic 300. Both indicators must be true in order for the first component to be satisfied.

In one embodiment, flow rate parameters and valve openings are analyzed to ensure the system is in service. These two parameters are verified against set or predetermined criteria to ensure erroneous identification of equipment as being in service is minimized. Both parameters meeting their criteria ensure the fractionating column is intended to be in service (e.g., feedstock valve is open) and is actually in service (e.g., high feedstock flow rate).

In further detail, one such indicator of feedstock flow is the valve position of a valve (such as crude oil valve 132 or 232) that controls the flow of feedstock into the column. In some embodiments, the valve position is expressed as a percentage of openness: 0% representing completely closed, 100% representing fully open, and numbers between 0% and 100% representing proportional degrees of open. For sake of simplicity, it is assumed that valve positions are automatically controlled (e.g., as part of automated control loops), and that their values are percentages between 0 and 100, and that these values can be obtained at any time as process data. Accordingly, in some embodiments, the first feedstock flow indicator is whether the feedstock valve position is greater than a first threshold value V1 (such as 5%).

Another such indicator of feedstock flow is the flow rate of the feedstock into the column, as measured by a flow rate sensor (such as crude oil flow sensor 134 or 234). In some embodiments, the flow rate is measured in barrels per day or thousand barrels per day (MBD). For sake of simplicity, it is assumed feedstock flow rates are measured in MBD, and that their values can be obtained at any time as process data. Accordingly, in some such embodiments, the second feedstock flow indicator is whether the measured feedstock flow rate is greater than a second threshold value V2 (such as 60 MBD or 100 MBD).

The second component (verification of reboiler inactivity) is making sure the reboiler is inactive, at least from the perspective of how much heating fluid is being drained from the reboiler. A tube-side leak in the heating fluid causes a decrease in the amount of heating fluid needed to heat the bottoms fluid coming from the fractionating column. This is because the heating fluid (such as desuperheated steam) transfers directly into the shell from the tube through the leak, allowing all of the steam's surplus heat to be immediately transferred to the bottoms fluid. More significantly, a tube-side leak in the heating fluid causes a significant drop in the amount of condensate exiting the reboiler. In some embodiments, the heating media control element (such as a control valve) is analyzed to determine whether the valve opening indicates any reduction over a set or predetermined period of time.

In further detail, since the leak does not go away during the fractionation process, the tube-side leak detection logic 300 uses an indicator of low condensate flow from the reboiler over time as part of condensate valve logic 320 to represent the second component. In this case, the valve position of the condensate valve (such as condensate valve 192, 292, or 297) over time is used to satisfy this component. More specifically, in the condensate valve logic 320, the condensate valve position is verified to be no greater than a third threshold value V3 (such as 1%) over a period of time that is at least a fourth threshold value V4 (such as four hours) to satisfy this indicator.

The third component (confirmation of reduction in heating media) is making sure the reboiler is losing the heating fluid, at least from the perspective of how much heating fluid is exiting the reboiler (such as in the form of condensate). A tube-side leak in the heating fluid causes a sharp decrease in the amount of heating fluid exiting the reboiler. This is because much of the heating fluid enters the shell through the leak rather than exits the reboiler via the tube. In some embodiments, the amount of condensate exiting the reboiler is verified using available flow meters. This also helps prevent erroneous false identification due to, for example, control valve bypasses being manually operated (e.g., the condensate valve being bypassed).

In further detail, since the leak does not go away during the fractionation process, the tube-side leak detection logic 300 uses an indicator of low heating fluid flow from the reboiler over time as part of condensate flow logic 330 to represent the third component. In this case, the flow rate of the heating fluid (as measured by a flow rate sensor, such as condensate flow sensor 194, 294, or 299) from the tube-side of the reboiler over time is used to satisfy this component. For sake of simplicity, such flow rates are assumed to be measured in gallons per minute (GPM). More specifically, in the condensate flow logic 330, the condensate flow rate is verified to be no greater than a fifth threshold value V5 (such as 5 GPM or 10 GPM) over a period of time that is at least a sixth threshold value V6 (such as four hours) to satisfy this indicator.

The fourth component (verification of reboiler temperature profile) is making sure the reboiler is heat exchanging. The leakage of heating media through the tubes impacts the temperature profile of the process in the reboiler and thus, a verification of this is carried out. That is, a tube-side leak in the heating fluid still results in heat exchanging, in that the bottoms fluid exits the reboiler at a higher temperature than when it entered. This is because the leaking heating fluid still transfers any of its excess heat to the bottoms fluid. In some embodiments, this component of the tube-side leak detection logic 300 uses temperature sensors of the bottoms fluid before entering the reboiler (such as input temperature sensors 162, 262, and 267) and after exiting the reboiler (such as output temperature sensors 172, 272, and 277) as part of temperature difference logic 340. For sake of simplicity, it is assumed that measured temperatures are in degrees Fahrenheit (° F.). For instance, in some embodiments, the temperature difference logic 340 verifies that the temperature difference between the bottoms fluid output temperature and the bottoms fluid input temperature is at least a seventh threshold value V7 (such as 20° F. or 30° F.) to satisfy this component.

Finally, the tube leakage logic 350 combines the output signals of the feedstock flow logic 310, the condensate valve logic 320, the condensate flow logic 330, and the temperature difference logic 340, and if they are all positive or true, the tube leakage logic 350 indicates that a tube-side leak has been detected. In addition, in some embodiments, the tube leakage logic 350 also generates an appropriate alert (e.g., to an operator or automated task) when a tube-side leak is detected. For example, in some embodiments, the automated task shuts down the affected reboiler until the tube leakage has been further investigated and addressed.

The described techniques herein can be implemented using a combination of sensors, valves, cameras, and other devices including computing, control, or other logic circuits configured (e.g., programmed) to carry out their assigned tasks. These devices are located on or in (or otherwise in close proximity to) the fractionating column or reboiler for carrying out the techniques. In some example embodiments, the control logic is implemented as computer code configured to be executed on a computing circuit (such as a microprocessor) to perform the control steps that are part of the technique.

Figure 4:
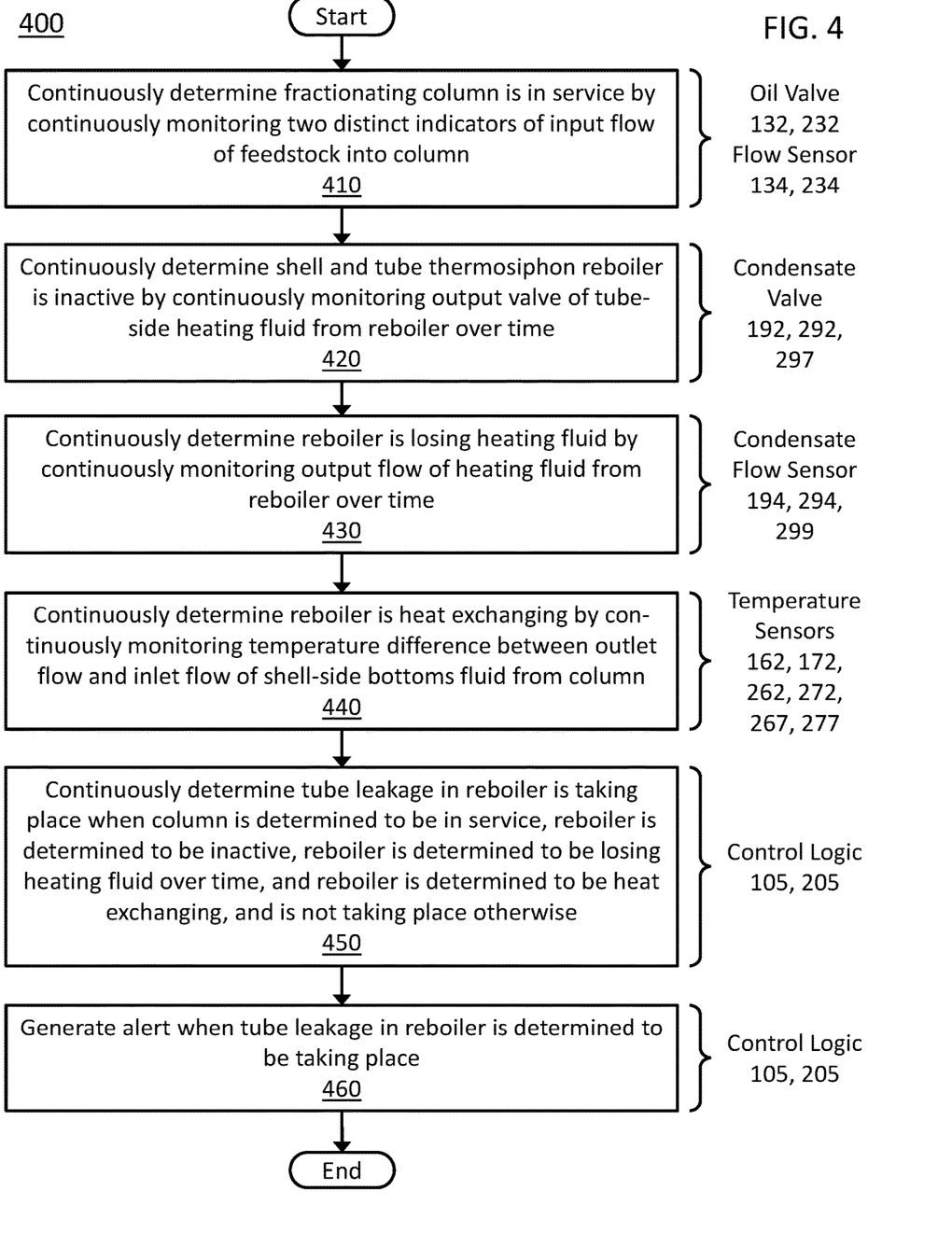
FIG. 4 is a flow diagram of an example method for detecting tube leakage in a shell and tube thermosiphon reboiler, according to an embodiment.

FIG. 4 is a flow diagram of an example method 400 for detecting tube leakage in a shell and tube thermosiphon reboiler (such as reboiler 120, 220, or 225), according to an embodiment. The method 400 is an automated method that continuously monitors for tube leakage in the shell and tube thermosiphon reboiler. The reboiler heats feedstock (such as crude oil feedstock 130 or 230, or petroleum) in a fractionating column (such as crude oil stabilizer 110 or 210). The method 400 is automated under the control of an electronic circuit (such as control logic circuit 105 or 205), which is configured (e.g., by code, such as programmed, by custom logic, as in configurable logic gates, or the like) to carry out the steps of the method 400.

Some or all of the method 400 can be performed using components and techniques illustrated in FIGS. 1-3. In addition, portions of this and other methods disclosed herein can be performed on or using process control logic, such as custom or preprogrammed control logic devices, circuits, or processors, such as a programmable logic circuit (PLC), computer, software, or other circuit (e.g., ASIC, FPGA) configured by code or logic to carry out their assigned task. The devices, circuits, or processors can also be, for example, dedicated or shared hardware devices (such as laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause portions of the method 400 (or other disclosed method) to be carried out. It should be noted that in other embodiments, the order of the operations can be varied, and that some of the operations can be omitted. Some of the method 400 can also be performed using logic, circuits, or processors located on or in electrical communication with a processing circuit configured by code to carry out these portions of the method 400.

In the method 400, processing begins with the step of continuously determining 410, by the control circuit, that the fractionating column is in service by continuously monitoring two distinct indicators of an input flow of the feedstock into the column. Here, continuously means very frequently, such as every second (or every five seconds) or more often. In some embodiments, continuously is based on the speed of the underlying process control logic controlling the fractionating column and the reboiler, e.g., as frequently as the underlying control logic is capable of detecting a change in the operating condition being monitored. The method 400 further includes the step of continuously determining 420, by the control circuit, that the shell and tube thermosiphon reboiler is inactive by continuously monitoring an output valve that controls an output flow of tube-side heating fluid (such as condensate, as in condensate 190, 290, or 295, or water) from the reboiler over time. In addition, the method 400 includes the step of continuously determining 430, by the control circuit, that the reboiler is losing the heating fluid by continuously monitoring the output flow of the heating fluid (such as condensate 190, 290, or 295, or water) from the reboiler over time.

The method 400 also includes the step of continuously determining 440, by the control circuit, that the reboiler is heat exchanging by continuously monitoring a temperature difference between an input flow of shell-side bottoms fluid (such as unheated bottoms fluid 160, 260, or 265) from the column into the reboiler and an output flow of the shell-side bottoms fluid (such as heated bottoms fluid 170, 270, or 275) from the reboiler into the column. The method 400 further includes the step of continuously determining 450, by the control circuit, that the tube leakage in the reboiler is taking place when the column is determined to be in service, the reboiler is determined to be inactive, the reboiler is determined to be losing the heating fluid, and the reboiler is determined to be heat exchanging, and is not taking place otherwise. In addition, the method 400 includes the step of generating 460, by the control circuit, an alert (such as an operator notification function or ONF) when the tube leakage in the reboiler is determined to be taking place.

In an embodiment, continuously determining 410 the column is in service includes the steps of: continuously monitoring, by the control circuit, a position of a first valve (such as crude oil valve 132 or 232) that controls a flow rate of the feedstock into the column; continuously monitoring, by the control circuit, the flow rate of the feedstock (such as by using crude oil flow sensor 134 or 234) into the column; and continuously determining, by the control circuit, that the column is in service when both the continuously monitored first valve position exceeds a first threshold (V1, such as 5%) and the continuously monitored flow rate of the feedstock into the column exceeds a second threshold (V2, such as 60 MBD or 100 MBD), and is not in service otherwise.

In an embodiment, continuously determining 420 the reboiler is inactive includes the steps of: continuously monitoring, by the control circuit from a first start time to a present time, a position of a second valve (such as condensate valve 192, 292, or 297) that controls a flow rate of the heating fluid from the reboiler; continuously determining, by the control circuit, that the reboiler is inactive when both the continuously monitored second value position does not exceed a third threshold (V3, such as 1%) and the difference between the current time and the first start time is at least a fourth threshold (V4, such as four hours), and is active otherwise; and continuously resetting, by the control circuit, the first start time to the current time when the continuously monitored second valve position exceeds the third threshold.

In an embodiment, continuously determining 430 the reboiler is losing the heating fluid includes the steps of: continuously monitoring, by the control circuit from a second start time to the present time, a flow rate of the heating fluid (such as by using condensate flow sensor 194, 294, or 299) from the reboiler; continuously determining, by the control circuit, that the reboiler is losing the heating fluid when both the continuously monitored flow rate of the heating fluid from the reboiler does not exceed a fifth threshold (V5, such as 5 GPM or 10 GPM) and the difference between the current time and the second start time is at least a sixth threshold (V6, such as four hours), and is not losing the heating fluid otherwise; and continuously resetting, by the control circuit, the second start time to the current time when the continuously monitored flow rate of the heating fluid from the reboiler exceeds the fifth threshold.

In an embodiment, continuously determining 440 the reboiler is heat exchanging includes the steps of: continuously monitoring, by the control circuit, a temperature of the input flow of the bottoms fluid (such as by using bottoms input temperature sensor 162, 262, or 267) from the column into the reboiler; continuously monitoring, by the control circuit, a temperature of the output flow of the bottoms fluid (such as by using bottoms output temperature sensor 172, 272, or 277) from the reboiler into the column; and continuously determining, by the control circuit, that the reboiler is heat exchanging when the difference between the continuously monitored bottoms fluid output flow temperature and the continuously monitored bottoms fluid input flow temperature is at least a seventh threshold (V7, such as 20° F. or 30° F.), and is not heat exchanging otherwise.

Any of the methods described herein may, in corresponding embodiments, be reduced to a non-transitory computer readable medium (CRM) having computer instructions stored therein that, when executed by a processing circuit, cause the processing circuit to carry out an automated process for performing the respective methods.

The methods described herein may be performed in whole or in part by software or firmware in machine readable form on a tangible (e.g., non-transitory) storage medium. For example, the software or firmware may be in the form of a computer program including computer program code adapted to perform some of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An automated method of detecting tube leakage in a shell and tube thermosiphon reboiler used to drive a fractionating column, the method comprising:

controlling, by a control circuit using process data, a fractionating process in the fractionating column using the shell and tube thermosiphon reboiler, the process data comprising:
  a flow rate of feedstock input to the column, as monitored by a feedstock input flow rate monitor;
  a position of a feedstock input valve for controlling the feedstock input flow rate, as monitored by a feedstock input valve position monitor;
  a position of a heating fluid input valve for controlling a flow rate of heating fluid input to a tube side of the reboiler, as monitored by a heating fluid input valve position monitor,
  a flow rate of the heating fluid output from the tube side of the reboiler, as monitored by a heating fluid output flow rate monitor;
  a temperature of bottoms fluid input to a shell side of the reboiler, as monitored by a bottoms fluid input temperature monitor; and
  a temperature of the bottoms fluid output from the shell side of the reboiler, as monitored by a bottoms fluid output temperature monitor;
continuously receiving, by the control circuit, the monitored feedstock input valve position and feedstock input flow rate;
continuously determining, by the control circuit using the received feedstock input valve position and feedstock input flow rate, that the column is in service or not in service;
continuously receiving, by the control circuit, the monitored heating fluid input valve position and heating fluid output flow rate;
continuously determining, by the control circuit using the received heating fluid input valve position, that the shell and tube thermosiphon reboiler is inactive or active;
continuously determining, by the control circuit using the received heating fluid output flow rate, that the reboiler is losing or not losing the heating fluid;
continuously receiving, by the control circuit, the monitored bottoms fluid input temperature and bottoms fluid output temperature;
continuously determining, by the control circuit using the received bottoms fluid input temperature and bottoms fluid output temperature, that the reboiler is heat exchanging or not heat exchanging;
continuously determining, by the control circuit, that the tube leakage in the reboiler is taking place when the column is determined to be in service, the reboiler is determined to be inactive, the reboiler is determined to be losing the heating fluid, and the reboiler is determined to be heat exchanging, and is not taking place otherwise; and
generating an alert, by the control circuit, when the tube leakage in the reboiler is determined to be taking place.

2. The method of claim 1, wherein:
continuously determining that the column is in service comprises determining when both the received feedstock input valve position exceeds a first threshold and the received feedstock input flow rate exceeds a second threshold, and is not in service otherwise.

3. The method of claim 1, wherein:
continuously receiving the heating fluid input valve position comprises setting a first start time to the current time at a beginning of the continuous receiving of the heating fluid input valve position and when the received heating fluid input valve position exceeds a third threshold; and
continuously determining that the reboiler is inactive comprises determining when the difference between the current time and the first start time is at least a fourth threshold, and is active otherwise.

4. The method of claim 1, wherein:
continuously receiving the heating fluid output flow rate comprises setting a second start time to the present current time at a beginning of the continuous receiving of the heating fluid output flow rate and when the received heating fluid output flow rate exceeds a fifth threshold; and
continuously determining that the reboiler is losing the heating fluid comprises determining when the difference between the current time and the second start time is at least a sixth threshold, and is not losing the heating fluid otherwise.

5. The method of claim 1, wherein:
continuously determining that the reboiler is heat exchanging comprises determining when the difference between the received bottoms fluid output temperature and the received bottoms fluid input temperature is at least a seventh threshold, and is not heat exchanging otherwise.

6. The method of claim 1, further comprising shutting down, by the control circuit, the reboiler when the tube leakage in the reboiler is determined to be taking place.

7. The method of claim 1, wherein the feedstock is petroleum, the column is a crude oil stabilizer, and the heating fluid is steam or water.

8. A control circuit to detect tube leakage in a shell and tube thermosiphon reboiler used to drive a fractionating column, the control circuit comprising:
  logic to control a fractionating process using process data, the fractionating process taking place in the fractionating column using the shell and tube thermosiphon reboiler, the process data comprising:
    a flow rate of feedstock input to the column, as monitored by a feedstock input flow rate monitor;
    a position of a feedstock input valve for controlling the feedstock input flow rate, as monitored by a feedstock input valve position monitor;
    a position of a heating fluid input valve for controlling a flow rate of heating fluid input to a tube side of the reboiler, as monitored by a heating fluid input valve position monitor,
    a flow rate of the heating fluid output from the tube side of the reboiler, as monitored by a heating fluid output flow rate monitor;
    a temperature of bottoms fluid input to a shell side of the reboiler, as monitored by a bottoms fluid input temperature monitor; and
    a temperature of the bottoms fluid output from the shell side of the reboiler, as monitored by a bottoms fluid output temperature monitor;
  logic to continuously receive the monitored feedstock input valve position and feedstock input flow rate;
  logic to continuously determine, using the received feedstock input valve position and feedstock input flow rate, that the column is in service or not in service;
  logic to continuously receive the monitored heating fluid input valve position and heating fluid output flow rate;
  logic to continuously determine, using the received heating fluid input valve position, that the shell and tube thermosiphon reboiler is inactive or active;

logic to continuously determine, using the received heating fluid output flow rate, that the reboiler is losing or not losing the heating fluid;

logic to continuously receive the monitored bottoms fluid input temperature and bottoms fluid output temperature;

logic to continuously determine, using the received bottoms fluid input temperature and bottoms fluid output temperature, that the reboiler is heat exchanging or not heat exchanging;

logic to continuously determine that the tube leakage in the reboiler is taking place when the column is determined to be in service, the reboiler is determined to be inactive, the reboiler is determined to be losing the heating fluid, and the reboiler is determined to be heat exchanging, and is not taking place otherwise; and logic to generate an alert when the tube leakage in the reboiler is determined to be taking place.

9. The control circuit of claim 8, wherein:
the logic to continuously determine that the column is in service comprises logic to determine that the column is in service when both the received feedstock input valve position exceeds a first threshold and the received feedstock input flow rate exceeds a second threshold, and is not in service otherwise.

10. The control circuit of claim 8, wherein:
the logic to continuously receive the heating fluid input valve position comprises logic to set a first start time to the current time at a beginning of the continuous receiving of the heating fluid input valve position and when the received heating fluid input valve position exceeds a third threshold; and the logic to continuously determine that the reboiler is inactive comprises logic to determine that the reboiler is inactive when the difference between the current time and the first start time is at least a fourth threshold, and is active otherwise.

11. The control circuit of claim 8, wherein:
the logic to continuously receive the heating fluid output flow rate comprises logic to set a second start time to the current time at a beginning of the continuous receiving of the heating fluid output flow rate and when the received heating fluid output flow rate exceeds a fifth threshold; and the logic to continuously determine that the reboiler is losing the heating fluid comprises logic to determine that the reboiler is losing the heating fluid when the difference between the current time and the second start time is at least a sixth threshold, and is not losing the heating fluid otherwise.

12. The control circuit of claim 8, wherein:
the logic to continuously determine that the reboiler is heat exchanging comprises logic to determine that the reboiler is heat exchanging when the difference between the received bottoms fluid output temperature and the received bottoms fluid input temperature is at least a seventh threshold, and is not heat exchanging otherwise.

13. The control circuit of claim 8, further comprising logic to shut down the reboiler when the tube leakage in the reboiler is determined to be taking place.

14. The control circuit of claim 8, wherein the feedstock is petroleum, the column is a crude oil stabilizer, and the heating fluid is steam or water.

15. A non-transitory computer readable medium (CRM) having computer instructions stored therein that, when executed by a processing circuit, cause the processing circuit to carry out an automated process of detecting tube leakage in a shell and tube thermosiphon reboiler used to drive a fractionating column, the process comprising:

controlling a fractionating process using process data, the fractionating process taking place in the fractionating column using the shell and tube thermosiphon reboiler, the process data comprising:
a flow rate of feedstock input to the column, as monitored by a feedstock input flow rate monitor;
a position of a feedstock input valve for controlling the feedstock input flow rate, as monitored by a feedstock input valve position monitor;
a position of a heating fluid input valve for controlling a flow rate of heating fluid input to a tube side of the reboiler, as monitored by a heating fluid input valve position monitor,
a flow rate of the heating fluid output from the tube side of the reboiler, as monitored by a heating fluid output flow rate monitor;
a temperature of bottoms fluid input to a shell side of the reboiler, as monitored by a bottoms fluid input temperature monitor; and
a temperature of the bottoms fluid output from the shell side of the reboiler, as monitored by a bottoms fluid output temperature monitor;

continuously receiving the monitored feedstock input valve position and feedstock input flow rate;
continuously determining, using the received feedstock input valve position and feedstock input flow rate, that the column is in service or not in service;
continuously receiving the monitored heating fluid input valve position and heating fluid output flow rate;
continuously determining, using the received heating fluid input valve position, that the shell and tube thermosiphon reboiler is inactive or active;
continuously determining, using the received heating fluid output flow rate, that the reboiler is losing or not losing the heating fluid;
continuously receiving the monitored bottoms fluid input temperature and bottoms fluid output temperature;
continuously determining, using the received bottoms fluid input temperature and bottoms fluid output temperature, that the reboiler is heat exchanging or not heat exchanging;
continuously determining that the tube leakage in the reboiler is taking place when the column is determined to be in service, the reboiler is determined to be inactive, the reboiler is determined to be losing the heating fluid, and the reboiler is determined to be heat exchanging, and is not taking place otherwise; and
generating an alert when the tube leakage in the reboiler is determined to be taking place.

16. The CRM of claim 15, wherein:
continuously determining that the column is in service comprises determining when both the received feedstock input valve position exceeds a first threshold and the received feedstock input flow rate exceeds a second threshold, and is not in service otherwise.

17. The CRM of claim 15, wherein:
continuously receiving the heating fluid input valve position comprises setting a first start time to the current time at a beginning of the continuous receiving of the heating fluid input valve position and when the received heating fluid input valve position exceeds a third threshold; and
continuously determining that the reboiler is inactive comprises determining when the difference between the current time and the first start time is at least a fourth threshold, and is active otherwise.

18. The CRM of claim 15, wherein:

continuously receiving the heating fluid output flow rate comprises setting a second start time to the current time at a beginning of the continuous receiving of the heating fluid output flow rate and when the received heating fluid output flow rate exceeds a fifth threshold; and continuously determining that the reboiler is losing the heating fluid comprises determining when the difference between the current time and the second start time is at least a sixth threshold, and is not losing the heating fluid otherwise.

19. The CRM of claim 15, wherein:

continuously determining that the reboiler is heat exchanging comprises determining when the difference between the received bottoms fluid output temperature and the received bottoms fluid input temperature is at least a seventh threshold, and is not heat exchanging otherwise.

20. The CRM of claim 15, wherein the process further comprises shutting down the reboiler when the tube leakage in the reboiler is determined to be taking place.

21. The CRM of claim 15, wherein the feedstock is petroleum, the column is a crude oil stabilizer, and the heating fluid is steam or water.

\* \* \* \* \*